United States Patent [19]
Jakob et al.

[11] Patent Number: 5,462,344
[45] Date of Patent: Oct. 31, 1995

[54] VALVE SUBASSEMBLY FOR A SLIP-REGULATED HYDRAULIC BRAKE SYSTEM

[75] Inventors: Gert Jakob, Stuttgart; Ralph Schimitzek, Moeckmuehl, both of Germany

[73] Assignee: Robert Bosch GmbH, Stuttgart, Germany

[21] Appl. No.: 185,080

[22] Filed: Jan. 24, 1994

[30] Foreign Application Priority Data

Mar. 4, 1993 [DE] Germany .................. 43 06 769.7

[51] Int. Cl.⁶ .................. B60T 8/32; B60T 13/66; F16B 13/08; F16K 31/06
[52] U.S. Cl. .................. 303/119.2; 137/596.17; 137/884
[58] Field of Search .................. 303/119.2; 137/596.17, 137/884; 251/129.15, 129.16

[56] References Cited

U.S. PATENT DOCUMENTS 4,757,943  7/1988  Sperling et al. .................. 137/884
4,785,848  11/1988  Leiber .................. 137/884
4,929,038  5/1990  Reinartz et al. .................. 303/119.2

FOREIGN PATENT DOCUMENTS 4100967  7/1992  Germany .
8302811  8/1983  WIPO .................. 137/884

*Primary Examiner*—Matthew C. Graham
*Attorney, Agent, or Firm*—Edwin E. Greigg; Ronald E. Greigg

[57] ABSTRACT

This invention is directed to a pressure regulating device including a subassembly of a pressure regulating device, which subassembly receives predominantly electric components, such as coils of electromagnetically actuatable valves. The subassembly has a component that contains coils and is encompassed by magnetic-flux-conducting, U-shaped iron parts, with play on all sides. When the first subassembly is brought together with a second subassembly, which contains a hydraulic part of the valves, valve domes reach through the iron parts and the coils. The iron parts are aligned and supported with spring force against a mounting surface of both subassemblies.

5 Claims, 1 Drawing Sheet

VALVE SUBASSEMBLY FOR A SLIP-REGULATED HYDRAULIC BRAKE SYSTEM

BACKGROUND OF THE INVENTION

The invention is based on a pressure regulating device as defined hereinafter. One such pressure regulating device is known from German patent application 41 00 967 A1, which describes a design of the pressure regulating device comprising two subassemblies; a first subassembly has magnet valve coils elastically and resiliently disposed in a lid, while a second subassembly comprises the hydraulic part of the valve in a valve receiving body. On completion of the first subassembly, the coils of the valves are contacted with printed circuit boards or conducting foils of an integrated electronic controller. When the two subassemblies are put together, the valve domes of the hydraulic parts of the valves reach through the coils, which are aligned relative to the domes. When the first subassembly is seated on the second subassembly, the coils take up their final positions. This disclosure offers no details about how the magnetic-flux-conducting iron parts are disposed with respect to the coils.

OBJECT AND SUMMARY OF THE INVENTION

The pressure regulating device according to the invention has the advantage over the prior art that first, upon installation, the iron part is associated in captive fashion with the first subassembly; second, it can easily take up its final position when the two subassemblies are put together, and, under the influence of a spring tongue, maintains a position which minimizes an unavoidable gap between the iron part and the second subassembly.

The invention will be better understood and further objects and advantages thereof will become more apparent from the ensuing detailed description of the preferred embodiment taken in conjunction with the drawings.

DESCRIPTION OF THE PREFERRED EMBODIMENT

Figure 2:
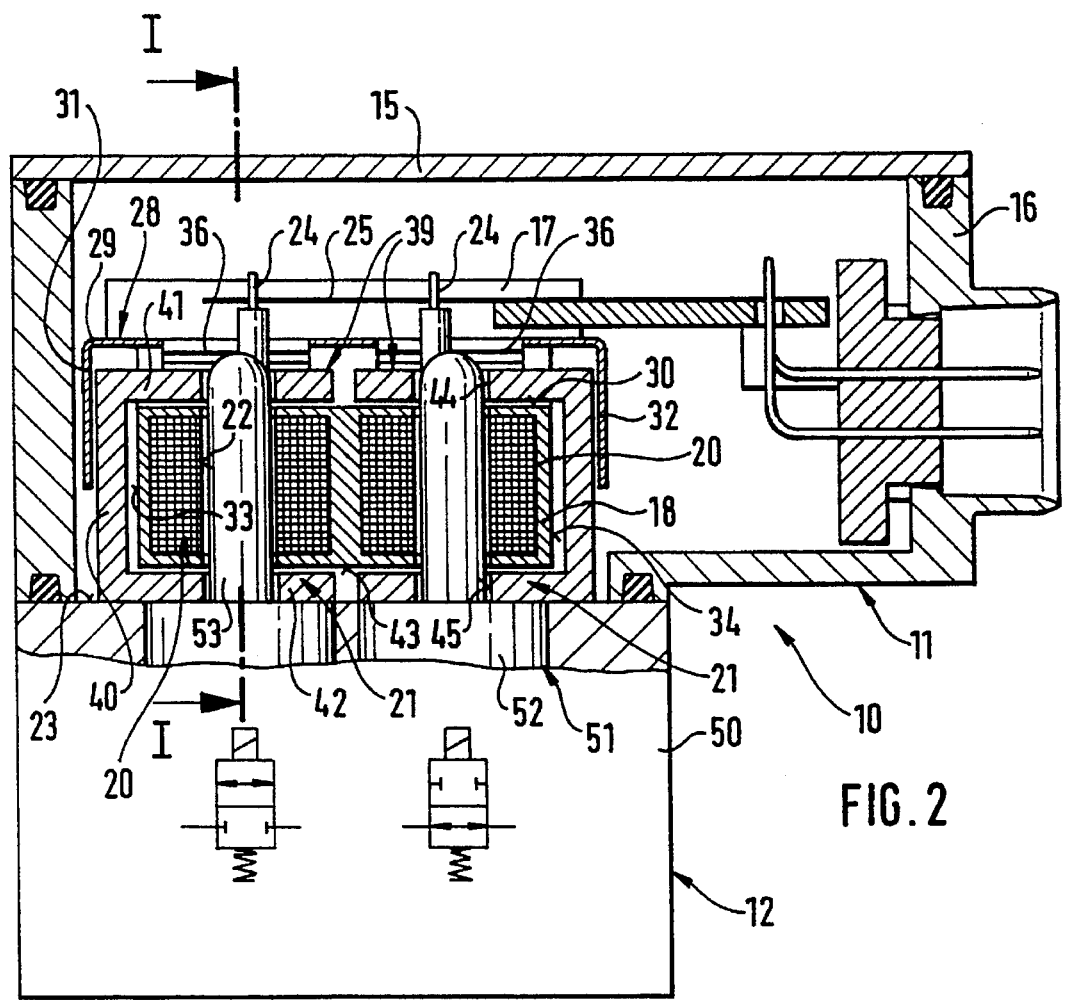
FIG. 2 shows a section through the first subassembly along the line II—II in FIG. 1 through an entire pressure regulating device comprising the first subassembly and a second subassembly, which includes the hydraulic parts of the valves.

A pressure regulating device 10 for a slip-regulated hydraulic brake system consists of a first subassembly 11, which essentially contains the electrical part, and a second subassembly 12, which essentially comprises the hydraulic part (FIG. 2).

Figure 1:
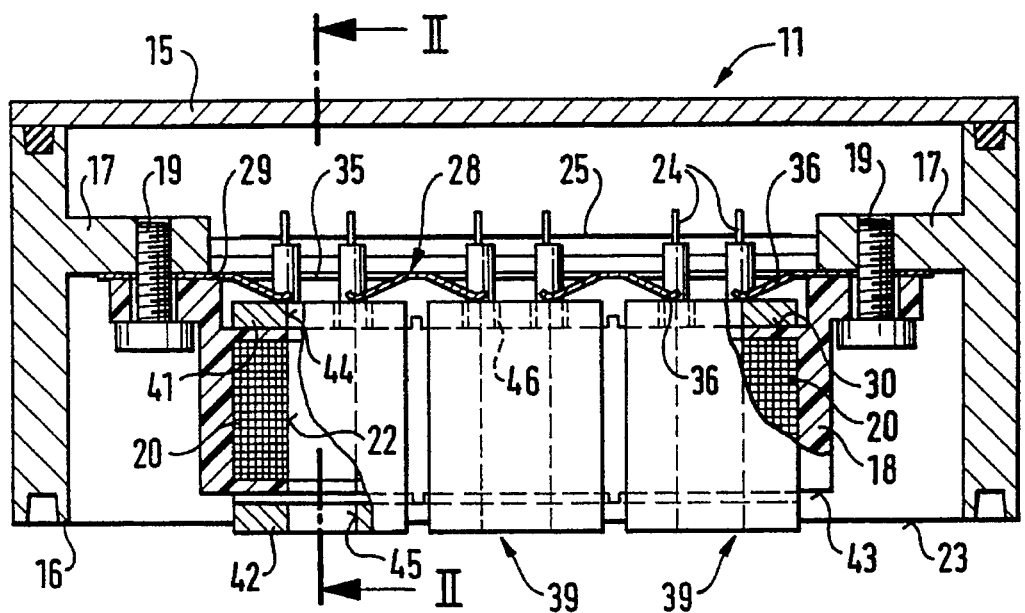
FIG. 1 shows a cross section along the line I— I in FIG. 2 through a first pressure regulating device subassembly which has coils and iron parts of magnet valves.

The first subassembly 11 has a housing frame 16 which is closed on top by means of a lid 15, but which is open on the bottom (FIG. 1). The housing frame 16 has opposing protrusions 17 formed onto its inner walls to which, remote from the lid, a block-shaped component 18 made of plastic is fastened with screws 19. Two rows of coils 20 of electromagnetically actuatable valves 21 are formed in the component 18. The block-shaped component 18 and the coils 20 are each provided with a passage 22, whose axis runs perpendicular to a mounting surface 23 of the subassembly 11 remote from the lid 15. The coils 20 are provided with contact elements 24, which are oriented toward the lid 15 and reach through a conductor foil 25 of an electronic controller, the rest of which is not shown, of the pressure regulating device 10.

Within the housing frame 16, the first subassembly 11 additionally contains a bracket 28 made of sheet spring steel with a U-shaped cross section. With its strut 29, the bracket 28 overlaps the broad side 30, toward the lid, of the block-shaped component 18. The bracket 28 is fastened on the end with its strut 29 between the component 18 and the inner wall protrusions 17 of the housing frame 16. Both legs 31 and 32 of the bracket 28 extend along the long, narrow edges 33 and 34, respectively, of the component 18. The strut 29 of the bracket 28, extending in spaced-apart fashion from the broad side 30, toward the lid, of the component 18, is provided with openings 35 for the contact elements 24 of the coils 20 to pass through. On both sides of the openings 35, spring tongues 36 are cut out of the strut 29 of the bracket 28 and bent toward the mounting face 23.

In the region of each coil 20, the block-shaped component 18 is encompassed by a magnetic-flux-conducting, U-shaped iron part 39. A yoke 40 of each of the iron parts 39 extends along the respective narrow edges 33, 34 of the component 18. A leg 41 of the iron parts 39 extends into the space between the component 18 and the strut 29 of the bracket 28. Two spring tongues 36 of the bracket 28 each contact one leg 41 and press it against the broad side 30 of the component 18, on the side of the lid 15. The second leg 42 of the iron parts 39, however, is associated with the broad side 43, mounting surface 23, of the component 18. When the first subassembly 11 is separate from the second subassembly 12 of the pressure regulating device 10, that is, upon preassembly of this subassembly or upon disassembly of the pressure regulating device 10, the legs 42 of the iron parts 39 take up the position shown in FIG. 1, in which position they extend, spaced relatively widely apart from the broad side 43 of the component 18, and protrude beyond the mounting surface 23. In addition, the legs 41, 42 of the iron parts 39 are provided with openings 44 and 45 extending along each passage 22 through the coils 20. The leg 41 is provided with slits 46 for the contact elements 24 of the coils 20.

Upon assembly of the first subassembly 11, the iron parts 39 are placed from both long, narrow sides 33, 34 upon the block-shaped component 18. Then the bracket 28 is seated on the component 18, so that the legs 31, 32 of the bracket 28 encompass the iron parts 39. Following this, the component 18 and the bracket 28 are secured to the housing frame 16 by screws 19. In the assembly steps that follow, the conducting foil 25 can be mounted and soldered to the contact elements 24 of the coils 20. After completion of assembly work and testing of the first subassembly 11, the housing frame 16 is closed with the lid 15. In this respect, the first subassembly 11 is complete.

The second subassembly 12 comprises a block-shaped valve block 50, which receives the hydraulic part 51 of the valves 21, which are additionally depicted symbolically. The valves 21 have a valve body 52, fastened in the valve block 50 in a manner not shown, which valve body 52 adjoins the common mounting surface 23 of both subassemblies 11, 12 of the pressure regulating device 10. The valve domes 53, however, which begin at the valve bodies 52, rise above the mounting surface 23.

When the first subassembly 11 and the second subassembly 12 of the pressure regulating device 10 are put together, each valve dome 53 reaches through the associated opening 45 in leg 42 of the iron part 39, the passage 22 of the associated coil 20, and the opening 44 in the leg 41 of the iron part 39, one after the other. Because of the play of the yoke 40 with regard to the block-shaped component 18 on the one hand and the legs 31, 32 of the bracket 28 on the other hand, the iron parts 39 can be aligned parallel to the mounting surface 23 by means of shifting movements. Just before the two subassemblies 11, 12 meet one another coplanar to the mounting surface 23, the valve bodies 52 engage the respective leg 42 of the U-shaped iron part 39 and press it back, counter to the initial tension of the spring tongues 36, to the plane of the mounting surface 23. Then the housing frame 16 of the subassembly 11 is attached to the valve block 50 of the subassembly 12 in a manner not shown, for example by means of screws. The spring tongues 36 of the bracket 28 frictionally fix the iron parts 39 in the position shown in FIG. 2, in which position the legs 41, 42 of the iron parts 39 run parallel to the mounting surface 23 and each encompass a gap between themselves and the component 18.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure regulating device (10) for a slip-regulated hydraulic brake system which comprises:

a first subassembly (11) including a housing frame (16) which receives two rows of coils (20) of electromagnetically actuatable valves (21), a second subassembly (12) is provided with a hydraulic part (51) of the valves (21), which includes a valve body (52) and a valve dome (53) which functions as a control for the valves, said first and second subassemblies (11, 12) adjoin one another at a mounting surface (23) with said first subassembly aligned above said second subassembly, so that the valve dome (53) of the hydraulic part (51) rises above the mounting surface (23) and extends through an associated coil (20), the coils (20) are embedded in a block-shaped component (18), the block-shaped component (18) includes the coils (20) and is fastened on component ends to protrusions (17) in a fixed position on a wall of the housing frame (16) with a bracket (28) disposed between said protrusions (17) and the block-shaped component (18), the block-shaped component (18) is encompassed in a region of the coils (20) by at least one magnetic-flux-conducting, U-shaped iron part (39), having play on all sides, wherein legs (41, 42) of the iron part (39) extend parallel to the mounting surface (23) and are provided with openings (44, 45) for at least one valve dome (53), in a region remote from the mounting surface (23), the block-shaped component (18) and the at least one iron part (39) are overlapped by the bracket (28), which with one leg (31) runs along an outside of a yoke (40) of the iron part (39) and with at least one spring tongue (36) engages the leg (41) of the iron part (39) remote from the mounting surface (23), so that this iron part (39) is frictionally supported against the second subassembly (12), and the leg (42) is remote from the bracket (28) of the at least one iron part (39) and is frictionally supported against at least one magnetic-flux-conducting valve body (52) of the second subassembly (12), and the leg (42) protrudes beyond the mounting surface (23) of the first subassembly (11) when the first subassembly (11) is separate from the second subassembly (12).

2. A pressure regulating device according to claim 1, in which the leg (41) of the at least one iron part (30), which leg is remote from the mounting surface (23), and the associated strut (29) of the bracket are provided with openings (35) for the contact elements (24) of the coils (20) to reach through.

3. A pressure regulating device according to claim 2, in which the at least one U-shaped iron part includes a plurality of U-shaped iron parts and the block-shaped component (18) has the coils (20) disposed in two rows and is encompassed from two opposing sides (33, 34) by the U-shaped iron parts (39), and further that the bracket (28) has a U-shaped cross section and overlaps the iron parts (39) on both sides with the at least one leg and at least one further leg (31, 32).

4. A pressure regulating device according to claim 1, in which the at least one U-shaped iron part includes a plurality of U-shaped iron parts and the block-shaped component (18) has the coils (20) disposed in two rows and is encompassed from two opposing sides (33, 34) by the U-shaped iron parts (39), and further that the bracket (28) has a U-shaped cross section and overlaps the iron parts (39) on both sides with the at least one leg and at least one further leg (31, 32).

5. A pressure regulating device according to claim 1, in which the leg (41) of the at least one iron part (30), which leg is remote from the mounting surface (23), and the associated strut (29) of the bracket (28) are provided with openings (35) and slits (46) for the contact elements (24) of the coils (20) to reach through.

* * * * *